(12) United States Patent
Kim et al.

(10) Patent No.: US 8,199,774 B2
(45) Date of Patent: Jun. 12, 2012

(54) METHOD AND APPARATUS FOR RECEIVING VARIABLE SIZED PACKETS IN A COMMUNICATION SYSTEM

(75) Inventors: Soon Ju Kim, Seoul (KR); Song Hun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 396 days.

(21) Appl. No.: 12/627,873

(22) Filed: Nov. 30, 2009

(65) Prior Publication Data

US 2010/0135321 A1    Jun. 3, 2010

(30) Foreign Application Priority Data

Nov. 28, 2008  (KR) .................. 10-2008-0119732

(51) Int. Cl.
*H04J 3/16* (2006.01)
(52) U.S. Cl. .................. 370/470; 370/329; 714/748

(58) Field of Classification Search ............... 370/470, 370/329; 714/748
See application file for complete search history.

(56) References Cited

U.S. PATENT DOCUMENTS

| 6,944,245 | B2* | 9/2005 | Stewart et al. ............ 375/350 |
| 2003/0099243 | A1* | 5/2003 | Oh et al. ............ 370/395.21 |
| 2008/0072115 | A1* | 3/2008 | Cho et al. ............ 714/751 |

\* cited by examiner

*Primary Examiner* — Luat Phung
(74) *Attorney, Agent, or Firm* — The Farrell Law Firm, P.C.

(57) ABSTRACT

A method and apparatus is disclosed that receives variable sized packets in a communication system. When a packet is received with a certain burst size, an LLR of the received packet is compared with a preset threshold and the burst size is changed. The received packet is combined with a stored packet. The stored packet is updated with the combined packet. The changed burst size is reported to the transmitter. The communication system can transmit variable sized packets according to a channel environment, and can reduce the probability of the occurrence of a decoding error and prevent waste of resources used due to re-transmission.

19 Claims, 5 Drawing Sheets

METHOD AND APPARATUS FOR RECEIVING VARIABLE SIZED PACKETS IN A COMMUNICATION SYSTEM

PRIORITY

This application claims priority to an application entitled "METHOD AND APPARATUS FOR RECEIVING VARIABLE SIZED PACKETS IN A COMMUNICATION SYSTEM" filed in the Korean Intellectual Property Office on Nov. 28, 2008 and assigned Serial No. 10-2008-0119732, the contents of which are incorporated herein by reference.

BACKGROUND OF THE INVENTION

1. Field of the Invention

The present invention relates to communication systems, and more particularly, to a method and apparatus that receives variable sized packets in a communication system.

2. Description of the Related Art

Universal Mobile Telecommunication Service (UMTS) systems refer to the $3^{rd}$ Generation (3G) asynchronous mobile communication system that is based on Global System for Mobile communications (GSM) and General Packet Radio Service (GPRS), and uses a Code Division Multiple Access (CDMA) scheme. The $3^{rd}$ Generation Partnership Project (3GPP) standardizing UMTS proposes an evolved packet system (EPS), such as a Long Term Evolution (LTE) system. The EPS is designed to perform the transmission and reception of packets at a high rate and high quality.

These conventional communication systems employ an error correction for packets, such as an Automatic Repeat ReQuest (ARQ) and a Hybrid Automatic ReQuest (HARQ). ARQ refers to an error correction technique that attempts the re-transmission of packets to reduce errors and loss of packets in wired communication systems as well as wireless communication systems. According to ARQ, packets before and after re-transmission are equal to each other. HARQ refers to an error correction technique that is advanced from ARQ. In HARQ, packets before and after re-transmission may differ from each other. HARQ reduces the block error rate (BLER) of packets by combining packets before re-transmission with those after re-transmission.

In the conventional communication system, HARQ causes a delay due to re-transmission, and accordingly the convergence rate of packets is decreased. Although BLER can theoretically be reduced to zero as HARQ infinitely repeats re-transmission, the frequency of re-transmissions is practically restricted in such a way to guarantee an appropriate BLER. To this end, a relatively large sized packet is transmitted or re-transmitted in communication systems, thereby reducing the probability of occurrence of a decoding error. If the packet size, however, becomes larger, the communication systems require a large amount of resources during the re-transmission, thereby causing a waste of resources.

SUMMARY OF THE INVENTION

The present invention has been made in view of the above problems, and provides a method and apparatus that can receive variable sized packets in a communication system.

In accordance with an embodiment of the present invention, the present invention provides a method for receiving variable sized packets from a transmitter in a communication system, the method including comparing, if a packet is received with a certain burst size, a Log Likelihood Ratio (LLR) of the received packet with a preset threshold, and changing the burst size; combining the received packet with a stored packet; and updating the stored packet with the combined packet and reporting the changed burst size to the transmitter.

Preferably, combining the received packet further includes adjusting the packet sizes of the received packet and the stored packet to be identical to each other.

In accordance with another embodiment of the present invention, the present invention provides a method for receiving variable sized packets from a transmitter in a communication system, the method including computing, if a packet is received with a certain burst size, a Log Likelihood Ratio (LLR) of the received packet; comparing the computed LLR with a preset threshold; changing the burst size; and reporting the changed burst size to the transmitter.

Preferably, the method further includes adjusting, if the received packet corresponds to a re-transmitted packet, the packet sizes of the received packet and the stored packet to be identical to each other, and combining the received packet with the stored packet; and updating the stored packet and the stored packet size with the combined packet and the adjusted packet size, respectively.

In accordance with another embodiment of the present invention, the present invention provides an apparatus for receiving variable sized packets from a transmitter in a communication system, including a decoder for computing a Log Likelihood Ratio (LLR) of a packet received with a certain burst size; a channel detector for comparing the computed LLR with a preset threshold; an LLR bit controller for changing the burst size according to the comparison result; a combiner for combining the received packet with a stored packet; and an LLR controller for updating the stored packet with the combined packet and reporting the changed burst size to the transmitter.

Preferably, the LLR controller adjusts the packet sizes of the received packet and the stored packet to be identical to each other and combines the received packet with the stored packet.

BRIEF DESCRIPTION OF THE DRAWINGS

The features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

The terms or words described in the present description and the claims should not be limited by a general or dictionary meaning, but instead should be analyzed as a meaning and a concept through which the inventor defines and describes the present invention to comply with the idea of the present invention. Therefore, one skilled in the art will understand that the embodiments disclosed in the description and configurations illustrated in the drawings are only preferred embodiments, and that there may be various modifications, alterations, and equivalents thereof to replace the embodiments at the time of filing this application.

A 'packet size' refers to the number of bits contained in a particular packet in a communication system. A 'burst size' refers to a predetermined size of virtual packets that will be transmitted under a particular condition in a communication system. An 'initial packet' refers to a packet that is initially transmitted in a communication system. An 'initial packet size' refers to the size of an initial packet.

A 'second packet' refers to a packet that is re-transmitted in a communication system. A 'second packet size' refers to the size of a second packet.

In a communication system, after a particular initial packet is transmitted, a second packet or another initial packet can be transmitted. After a particular second packet is transmitted, another second packet or another initial packet can be transmitted.

The initial packet size and the second packet size may be identical to or differ from each other.

A 'combined packet' is composed of at least two packets that are combined. The combined packet is formed by combining an initial packet with a second packet or combining another combined packet with another second packet. A 'combined packet size' refers to the size of a combined packet.

In an embodiment of the present invention, the communication system is implemented with a wireless packet data system supporting Hybrid Automatic Repeat request (HARQ) scheme, such as a Universal Mobile Telecommunication Service (UMTS) High-Speed Downlink Packet Access (UMTS HSDPA), CDMA2000 EVolution in Data Only (CDMA2000 1x-EV-DO), CDMA2000 EVolution in Data and Voice (CDMA2000 1x-EV-DV), IEEE 802.16e, etc.

Figure 1:
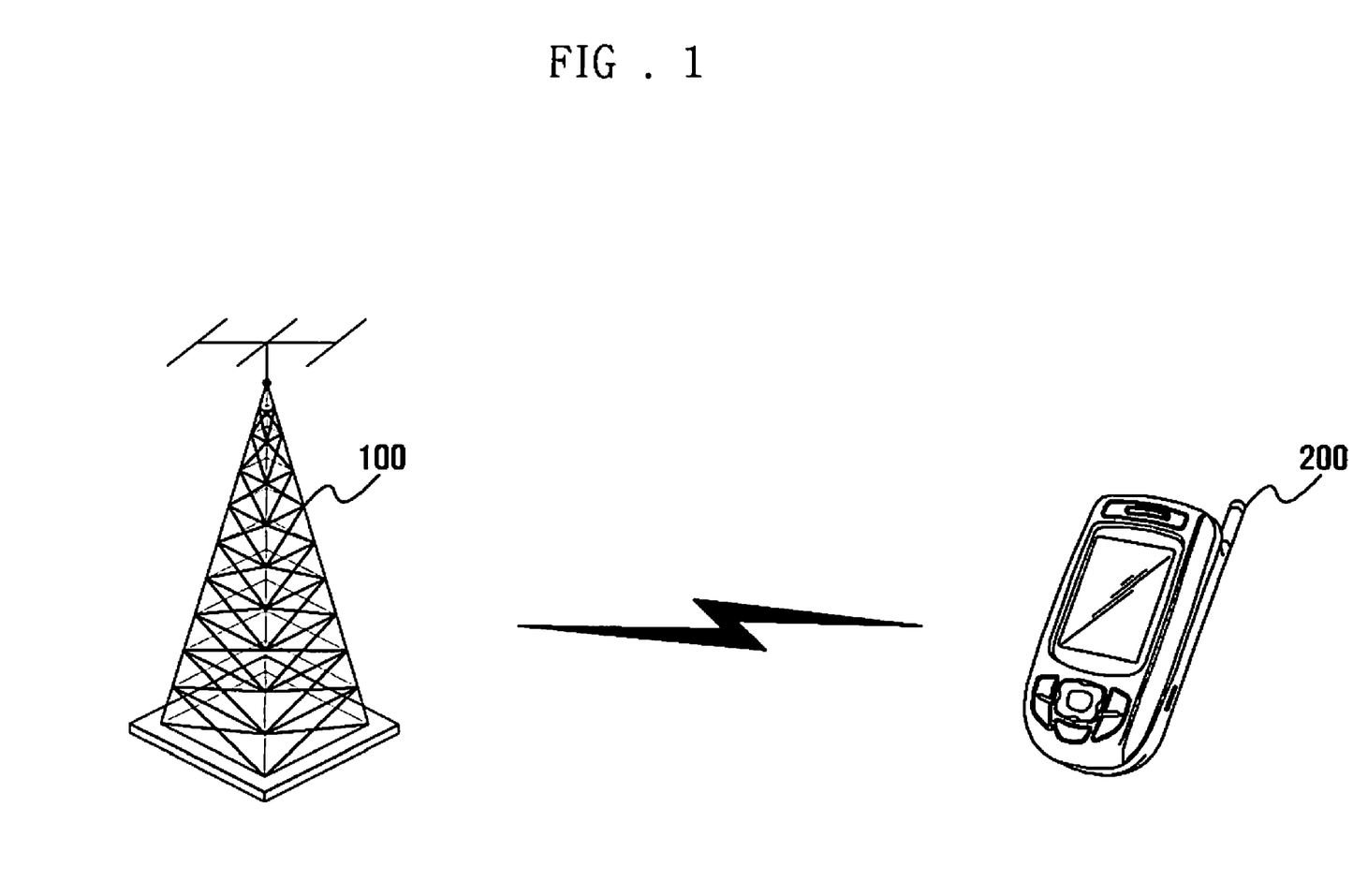
FIG. 1 is a view illustrating a configuration of a communication system.

FIG. 1 is a view illustrating a configuration of a communication system.

Referring to FIG. 1, the communication system includes a transmitter 100 and a receiver 200. The transmitter 100 refers to a base station. The receiver 200 refers to a mobile communication terminal. The transmitter 100 and receiver 200 transmit and receive packets to and from each other via a traffic channel. They also transmit and receive HARQ response signals with respect to packets, such as an acknowledgement (ACK) message or non-acknowledgement (NACK) message, to and from each other via a control channel.

When the receiver 200 receives a packet from the transmitter 100, it decodes the received packet. If the receiver 200 successfully decodes the received packet, it transmits an ACK message to the transmitter 100. When the transmitter 100 receives the ACK message, it transmits other packets to the receiver 200. On the contrary, if the receiver 200 fails to decode the received packet, it transmits a NACK message to the transmitter 100. The transmitter 100 receives the NACK message and then re-transmits a corresponding packet to the receiver 200. Re-transmission between the transmitter 100 and receiver 200 may be repeated until a corresponding packet is successfully decoded or a predetermined number of repetitions are performed. The success or failure of the decoding operation often depends on a channel environment between the transmitter 100 and receiver 200 in a communication system. Furthermore, if the receiver 200 receives a corresponding packet from the transmitter 100, it may combine corresponding packets before and after re-transmission.

Figure 2:
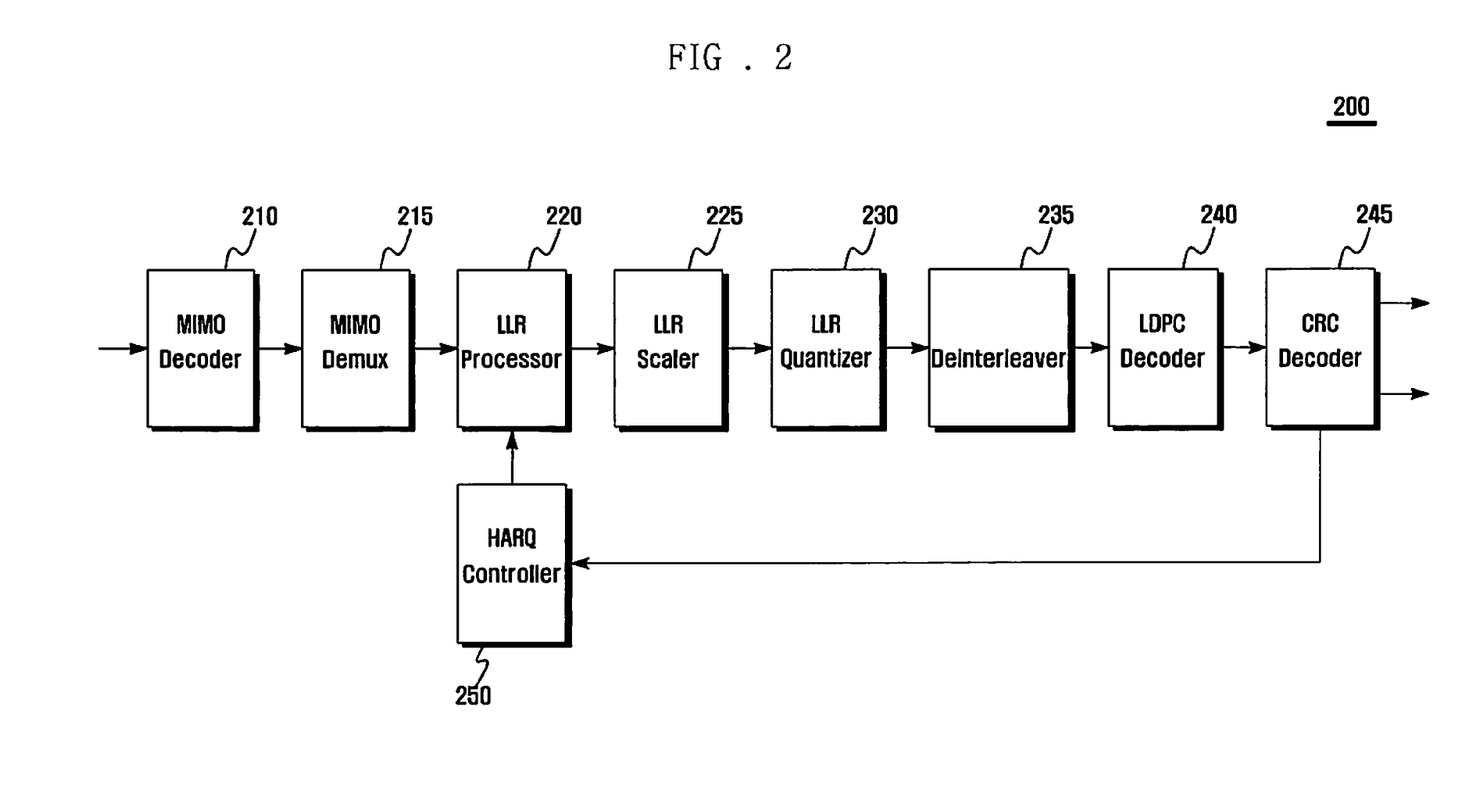
FIG. 2 is a schematic block diagram illustrating a receiver according to an embodiment of the present invention.

FIG. 2 is a schematic block diagram illustrating a receiver 200 according to an embodiment of the present invention. The configuration of the receiver 200 is explained in detail in FIG. 2.

Referring to FIG. 2, the receiver 200 includes a Multi-Input Multi-Output decoder (MIMO decoder) 210, a Multi-Input Multi-Output de-multiplexer (MIMO Demux) 215, a Log Likelihood Ratio processor (LLR processor) 220, a Log Likelihood Ratio scaler (LLR scaler) 225, a Log Likelihood Ratio quantizer (LLR quantizer) 230, a deinterleaver 235, a Low Density Parity Check decoder (LDPC decoder) 240, a Cyclic Redundancy Check decoder (CRC decoder) 245, and a HARQ controller 250.

When the MIMO decoder 210 receives a packet from the transmitter 100, it decodes the received packet and measures the decoding reliability of the packet. The MIMO decoder 210 decodes the received packet and outputs bits of the packet according to a certain method. The MIMO decoder 210 computes the log likelihood ratio (LLR) of the bits to measure the decoding reliability of the packet. The LLR refers to the decoded bit error probability of bits.

The MIMO Demux 215 demultiplexes the packet.

The LLR processor 220 detects a current channel environment based on the LLR for the packet, and determines a burst size according to the channel environment. When the LLR processor 220 receives a packet of a certain packet size, it determines a burst size according to the channel environment. After that, the LLR processor 220 combines packets before and after re-transmission.

Figure 3:
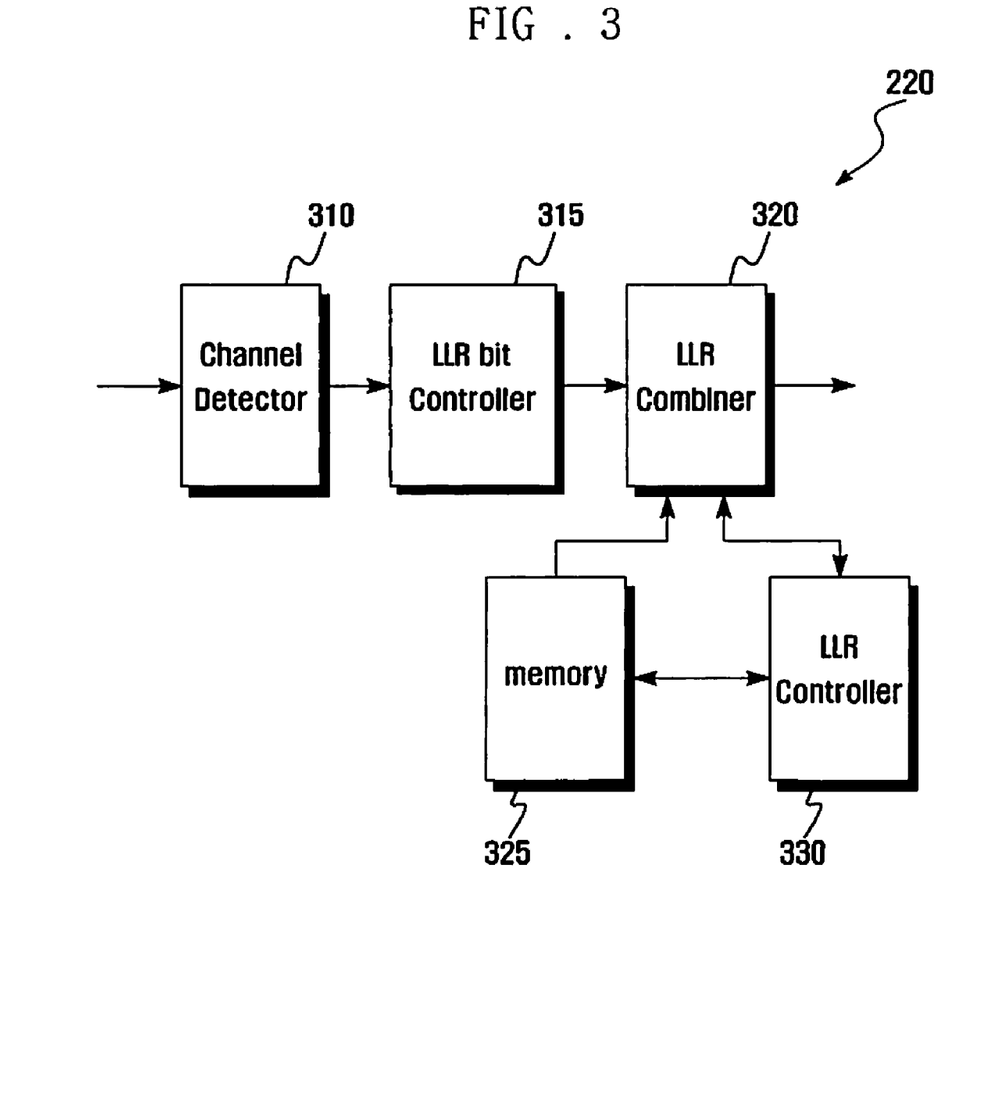
FIG. 3 is a schematic block diagram illustrating an LLR processor of FIG. 2.

FIG. 3 is a schematic block diagram illustrating an LLR processor 220 of FIG. 2. The configuration of the LLR processor 220 is explained in detail with reference to FIG. 3.

The LLR processor 220 includes a channel detector 310, an LLR bit controller 315, an LLR combiner 320, a memory 325, and an LLR controller 330.

The channel detector 310 compares the LLR with a preset threshold TH. The LLR bit controller 315 determines a burst size according to the LLR. If the LLR is greater than or equal to the threshold TH, the LLR bit controller 315 reduces the burst size to be smaller than the packet size. On the contrary, if the LLR is less than the threshold TH, the LLR bit controller 315 increases the burst size to be greater than the packet size. The LLR combiner 320 combines packets. The memory 325 stores packets. The LLR controller 330 determines whether to re-transmit a packet. If the LLR controller 330 ascertains that a packet corresponds to an initially transmitted packet, it stores the packet in the memory. If the LLR controller 330 ascertains that a packet corresponds to a re-transmitted packet, it controls the LLR combiner 320 to combine the packet. To this end, the LLR controller 330 adjusts the size of the packet and combines the packet to update a corresponding packet in the memory 325.

Referring back to FIG. 2, the Log Likelihood Ratio scaler (LLR scaler) 225 divides the packet according to a certain rule. The Log Likelihood Ratio quantizer (LLR quantizer) 230 quantizes the divided packet.

The deinterleaver 235 deinterleaves the packet. The Low Density Parity Check decoder (LDPC decoder) 240 decodes an LDPC code in the packet. The Cyclic Redundancy Check decoder (CRC decoder) 245 decodes a CRC code in the packet. The LDPC decoder 240 and CRC decoder 245 determine whether a decoding error occurs in the packet. The HARQ controller 250 controls transmission of an HARQ response signal, i.e., an ACK or NACK message, according to whether a decoding error has occurred in the packet. The HARQ controller 250 transmits an ACK message to the LLR processor 220 if decoding has succeeded and a NACK message if decoding has failed. The HARQ controller 250 reports a burst size according to a channel environment, through an ACK or NACK message.

The transmitter 100 transmits the packets with a certain burst size to the receiver 200. When the receiver 200 receives the packets, it changes a burst size according to the channel environment and then reports the changed burst size. When the receiver 200 reports the burst size to the transmitter 100, the transmitter 200 transmits packets with a corresponding burst size. The transmitter 100 may re-transmit the packets with a corresponding burst size and may also initially transmit other packets with a corresponding burst size.

Therefore, the method and apparatus according to the present invention can determine a burst size according to a channel environment, and transmit packets in a size corresponding to the determined burst size in a communication system. That is, variable sized packets can be transmitted in the communication system. Accordingly, the communication system can reduce the probability of the occurrence of a decoding error and the amount of resources used due to re-transmission.

Figure 4:
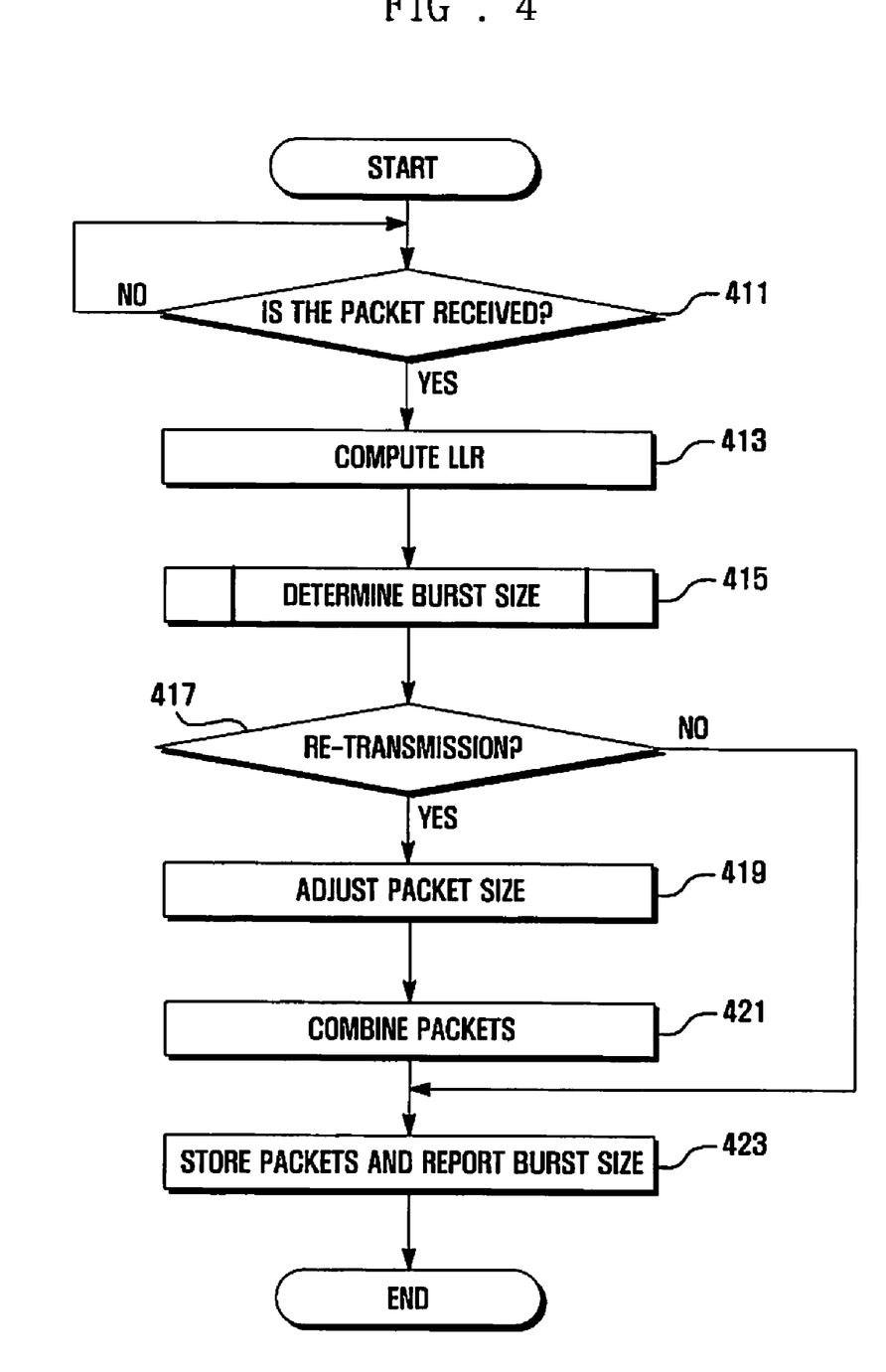
FIG. 4 is a flow chart that describes a method for receiving variable sized packets in a communication system, according to an embodiment of the present invention.

FIG. 4 is a flow chart that describes a method for receiving variable sized packets in a communication, according to an embodiment of the present invention. A description is provided regarding the operation of the receiver 200 in the communication system, with reference to FIG. 4.

Referring to FIG. 4, when the receiver 200 receives a packet with a certain burst size from the transmitter 100, the MIMO decoder 210 detects the received packet in step 411 and then computes an LLR of the packet in step 413. The size of the packet transmitted from the transmitter 100 corresponds to the burst size.

After that, the LLR processor 220 determines a burst size according to the LLR of the packet in step 415. It also identifies the current channel environment according to the LLR, and may change the burst size according to the channel environment. For example, the LLR processor 220 can change the minimum burst size with which decoding can be performed in a corresponding channel environment.

Figure 5:
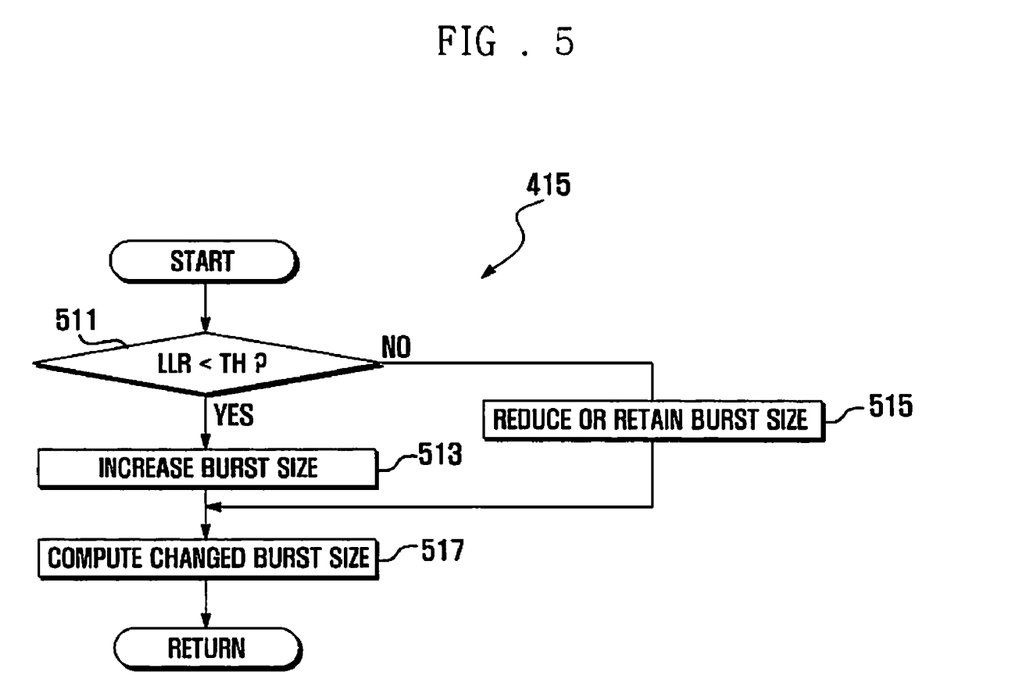
FIG. 5 is a flow chart that describes a process for determining a burst size in FIG. 4.

FIG. 5 is a flow chart that describes a process for determining a burst size in the LLR processor 220, regarding step 415 in FIG. 4.

Referring to FIG. 5, the channel detector 310 compares the LLR of the packet with a preset threshold TH in step 511. The channel detector 310 determines whether the LLR is less than the threshold TH. If the channel detector 310 ascertains that the LLR is less than the threshold TH at step 511, the LLR bit controller 315 increases the burst size in step 513. On the contrary, if the channel detector 310 ascertains that the LLR is greater than or equal to the threshold TH at step 511, the LLR bit controller 315 decreases the burst size in step 515.

For example, the LLR bit controller 315 distinguishes a decoding success part, a decoding failure part, and a decoding adjustment part in the bit stream of the packet. The LLR bit controller 315 compares the LLR with a plurality of thresholds. For example, the LLR bit controller 315 can identify a part in the bit stream where the LLR is greater than or equal to a first threshold as a decoding success part. The LLR bit controller 315 can identify a part in the bit stream where the LLR is less than a second threshold as a decoding failure part. The LLR bit controller 315 can identify a part in the bit stream where the LLR is less than the first threshold but greater than or equal to the second threshold or where the variation width of the LLR is extremely large as a decoding success part. After that, the LLR bit controller 315 can decrease the burst size in the decoding success and failure parts. Furthermore, if the LLR of the decoding adjustment part is less than a third threshold, the LLR bit controller 315 increases the burst size to be greater than the decoding adjustment part. If the LLR of the decoding adjustment part is greater than or equal to the third threshold, the LLR bit controller 315 decreases the burst size to be smaller than the decoding adjustment part.

After adjusting the burst size at steps 513 and 515, the LLR controller 330 computes the size difference between the packet size and the burst size in step 517, and then the procedure returns to the flow chart of FIG. 4. The packet size, burst size, and the size difference are expressed by the following Equation (1).

$$PS = E \times BS \quad (1)$$

Where PS denotes a size of a current packet, BS denotes a burst size according to a channel environment, and E denotes a size difference.

The size difference can be acquired by the following Equation (2).

$$E_a^{b+1} = \begin{cases} \min(E_a^b, A - X), & \text{if } 2^x \le \sigma^2 < 2^{x+1}, X = 0, 1, \ldots, N \\ \min(E_a^b, A), & \text{if } \sigma^2 = 0 \end{cases} \quad (2)$$

Were σ denotes noise and A denotes the Signal-to-Noise Ratio (SNR) in the packet.

Referring back to FIG. 4, the LLR processor 220 determines whether to re-transmit a packet in step 417. That is, it determines whether the packet corresponds to an initial packet or a re-transmitted packet. To this end, the LLR processor 220 refers to an LLR combined table as illustrated in the following Table 1.

TABLE 1

| Validity | ACID | LLR ptr | EB size |
|---|---|---|---|
| — | — | — | — |
| — | — | — | — |

The LLR processor 220 stores ACID, LLR ptr, EB size, etc. The ACID (HARQ Channel ID) refers to identification information regarding a corresponding HARQ channel of a packet. The LLR ptr denotes a position where a packet is stored. The EB (Encoding Block) size denotes packet size. The LLR processor 220 determines whether an ACID of a packet exists in the LLR combined table and thus determines whether to re-transmit a packet. If the LLR processor 220 ascertains that an ACID of a packet does not exist in the LLR combined table, it can conclude that the packet corresponds to the initially transmitted packet. On the contrary, if the LLR processor 220 ascertains that an ACID of a packet exists in the LLR combined table, it can conclude that the packet corresponds to the re-transmitted packet. The packet stored at a position corresponding to an ACID may be an initial packet or a combined packet. The packet size corresponding to an ACID may be an initial packet size or a combined packet size.

When the LLR processor 220 ascertains that a packet corresponds to an initially transmitted packet at step 417, it stores the initial packet and the initial packet size and reports the burst size to the transmitter 100 in step 423. That is, the LLR processor 220 stores the initial packet in the memory 325 and also an ACID, a storage position, and the initial packet size of the initial packet in the LLR combined table. After that, the HARQ controller 250 controls the LLR processor 220 to report the burst size.

On the contrary, when the LLR processor 220 ascertains that a packet corresponds to a re-transmitted packet at step 417, it adjusts the packet size in step 419. That is, if an ACID exists in the LLR combined table, the LLR processor 220 concludes that the packet corresponds to a second packet. After that, the LLR processor 220 adjusts the packet size using the size difference. To this end, the LLR processor 220 refers to the LLR combined table, and adjusts a second size of the second packet. Alternatively, the LLR processor 220 can adjust the initial packet size or combined packet size in the LLR combined table. To this end, the LLR processor 220 can add a zero to the Least Significant Bit (LSB) of the second packet. The LLR processor 220 can also add a zero to the LSB of the initial packet or combined packet in the memory 325. That is, the LLR processor 220 can be operated so that the second size is equal to the initial packet size or the combined packet size.

Next, the LLR processor 220 combines the packets in step 421. The LLR processor 220 stores the combined packet and the combined packet size and then reports the burst size to the transmitter 100. That is, the LLR processor 220 updates the memory 325 and the LLR combined table. The LLR processor 220 stores the combined packet in a position corresponding to an ACID of the second packet, referring to the LLR combined table. The LLR processor 220 also stores the combined packet size in the LLR combined table. After that, the HARQ controller 250 controls the LLR processor 220 to report the burst size.

Although not shown in the drawings, the LLR processor 220 can delete a packet when the HARQ controller 250 transmits an ACK message with respect to the packet.

Although the present invention is implemented in such a way that the receiver increases or decreases the burst size according to the LLR, it should be understood that the present invention is not limited to this above described embodiment. That is, the embodiment may be modified in such a way that the receiver can retain the burst size according to the LLR. For example, if the LLR is less than a threshold, the receiver can increase or retain the burst size. If the LLR is greater than or equal to the threshold, the receiver can decrease the burst size. If the LLR is less than the threshold, the receiver can increase the burst size. If the LLR is greater than or equal to the threshold, the receiver can decrease or retain the burst size.

As described above, the method and apparatus for receiving variable sized packets in a communication system, according to the present invention, can determine a burst size for transmitting packets according to a channel environment, and transmit packets in a size corresponding to the determined burst size, i.e., variable sized packets. Therefore, the communication system can reduce the probability of the occurrence of a decoding error and prevent waste of resources used due to re-transmission.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for receiving variable sized packets from a transmitter in a communication system, the method comprising:

comparing, if a packet is received with a certain burst size, a Log Likelihood Ratio (LLR) of the received packet with a preset threshold, and changing the burst size;
combining the received packet with a stored packet; and
updating the stored packet with the combined packet, and reporting the changed burst size to the transmitter.

2. The method of claim 1, wherein combining the received packet further comprises:
adjusting the packet sizes of the received packet and the stored packet to be identical to each other.

3. The method of claim 1, wherein changing the burst size further comprises:
decreasing the burst size if the LLR is greater than or equal to the threshold.

4. The method of claim 1, wherein changing the burst size further comprises:
increasing the burst size if the LLR is less than the threshold.

5. The method of claim 2, wherein:
combining the received packet with a stored packet is performed if the received packet corresponds to a re-transmitted packet; and
updating the stored packet and reporting the changed burst size further comprises updating the stored packet size with the adjusted packet size.

6. The method of claim 5, further comprising:
storing the received packet if the received packet corresponds to an initially transmitted packet;
storing a packet size of the received packet; and
reporting the changed burst size to the transmitter.

7. The method of claim 5, wherein updating the stored packet and reporting the changed burst size further comprises reporting the changed burst size via a Hybrid Automatic Repeat reQuest (HARQ) response signal of the received packet.

8. A method for receiving variable sized packets from a transmitter in a communication system, the method comprising:
computing, if a packet is received with a certain burst size, a Log Likelihood Ratio (LLR) of the received packet;
comparing the computed LLR with a preset threshold;
changing the burst size; and
reporting the changed burst size to the transmitter.

9. The method of claim 8, wherein changing the burst size further comprises:
decreasing the burst size if the LLR is greater than or equal to the threshold; and
increasing the burst size if the LLR is less than the threshold.

10. The method of claim 8, further comprising:
adjusting, if the received packet corresponds to a re-transmitted packet, the packet sizes of the received packet and the stored packet to be identical to each other, and combining the received packet with the stored packet; and
updating the stored packet and the stored packet size with the combined packet and the adjusted packet size, respectively.

11. The method of claim 10, further comprising:
storing the received packet if the received packet corresponds to an initially transmitted packet; and
storing the size of the received packet as the burst size.

12. The method of claim 8, wherein reporting the changed burst size is performed via a Hybrid Automatic Repeat reQuest (HARQ) response signal of the received packet.

13. An apparatus for receiving variable sized packets from a transmitter in a communication system, comprising:

a decoder for computing a Log Likelihood Ratio (LLR) of a packet received with a certain burst size;
a channel detector for comparing the computed LLR with a preset threshold;
an LLR bit controller for changing the burst size according to the comparison result;
a combiner for combining the received packet with a stored packet; and
an LLR controller for updating the stored packet with the combined packet and reporting the changed burst size to the transmitter.

14. The apparatus of claim 13, wherein the LLR controller adjusts the packet sizes of the received packet and the stored packet to be identical to each other and combines the received packet with the stored packet.

15. The apparatus of claim 13, wherein the LLR bit controller decreases the burst size if the LLR is greater than or equal to the threshold.

16. The apparatus of claim 13, wherein the LLR bit controller increases the burst size if the LLR is less than the threshold.

17. The apparatus of claim 14, wherein the LLR controller combines the received packet with the stored packet if the received packet corresponds to a re-transmitted packet, and updates the stored packet size with the adjusted packet size.

18. The apparatus of claim 17, wherein the LLR controller stores the received packet if the received packet corresponds to an initially transmitted packet and stores a packet size of the received packet as the burst size.

19. The apparatus of claim 14, further comprising a Hybrid Automatic Repeat reQuest (HARQ) controller which reports the changed burst size via an HARQ response signal of the received packet.

* * * * *